United States Patent [19]
Beranek et al.

[11] 3,897,546
[45] July 29, 1975

[54] METHOD OF COOLING OR HEATING FLUIDIZED BEDS

[75] Inventors: Jaroslav Beranek, Prague; Milos Kaspar, Jirkov; Vladimir Bazant, Prague; Antonin Chladek, Jirkov, all of Czechoslovakia

[73] Assignee: Ceskoslovenska akademie ved, Prague, Czechoslovakia

[22] Filed: Oct. 19, 1971

[21] Appl. No.: 190,517

[30] Foreign Application Priority Data
Oct. 22, 1970 Czechoslovakia ............... 7115-70

[52] U.S. Cl. .................. 423/659; 423/1; 75/26
[51] Int. Cl. ...... C22b 1/10; C01b 31/20; C01g 1/00
[58] Field of Search ............... 75/26; 423/659 F, 1

[56] References Cited
UNITED STATES PATENTS

| 2,321,310 | 6/1943 | Moore | 75/26 |
| 2,621,118 | 12/1952 | Cyr et al. | 75/26 UX |
| 2,674,612 | 4/1954 | Murphree | 75/26 UX |
| 2,683,685 | 7/1954 | Matheson | 423/659 UX |
| 2,729,598 | 1/1956 | Garbo | 423/659 UX |
| 3,702,819 | 11/1972 | Metrailer | 423/659 |

FOREIGN PATENTS OR APPLICATIONS

| 488,276 | 11/1952 | Canada | 423/659 |
| 517,416 | 10/1955 | Canada | 423/659 |
| 553,296 | 1/1960 | Belgium | 423/659 |
| 589,879 | 7/1947 | United Kingdom | 423/659 |

*Primary Examiner*—Edward Stern
*Attorney, Agent, or Firm*—Murray Schaffer

[57] ABSTRACT

A method for adjusting and controlling the temperature in chemical reaction, that is, of cooling or heating fluidized beds wherein the fluidized bed is demixed into two or more sectional fluidized beds having different rates of longitudinal particle mixing, by dividing a flow of fluidizing gas and/or liquid into two or more flows to be supplied to different levels of the fluidized bed, the rate of cooling or heating being modified by changing the throughflow of the fluidizing gas and/or liquid within said individual flows. One or more of the sectional fluidized beds are associated with heat exchangers.

6 Claims, 2 Drawing Figures

METHOD OF COOLING OR HEATING FLUIDIZED BEDS

BACKGROUND OF THE INVENTION

The present invention relates to a method for adjusting and controlling the temperature in chemical reaction, that is, of cooling or heating chemical reactors with non-uniform fluidized beds at a varying rate of both removal and supply of heat.

To remove heat from fluidized-bed reactors in which an exothermic reaction proceeds by introducing a cooling medium thereto which is caused to flow through coils or pipes submerged into the fluidized bed is know. Such methods have particularly been referred to in the work by Kunii D., Levenspiel O., in Fluidization Engineering, McGraw Hill, New York (1969) and by Aerov M. E., Todes O. M., Ghidravlicheskye i teplovye osnovy raboty apparatov so statzionarnym i kopyashchim zernistym sloyem, Kchimiya Moskva (1968). In practising the aforesaid described methods it is desirable, as a rule, to maintain constant the temperature of the fluidized bed at a varying heat removal rate which latter can be brought about by a change in the apparatus output, or in the composition of the substances being processed. A typical example of a reactor with varying output is a fluidized-bed furnace for combustion of solid fuels to generate steam for power plants. Changes in output due to varying composition of the substance being processed occur, for instance, in the roasting of pyrite ores. An analogous phenomenon can be observed even in endothermic reactions carried out in fluidized beds as referred to in the paper by Machonin K. E., Tishchenko A. T., Vysokotemperatutnye ustanovki s kipyashchim sloyem, Tekchnika Kyev (1966). Thus, for example, in the processing of soda by calcination, due to the varying humidity of the raw material dosed, there arise changes in the total amount of heat necessary for the process.

Generally, methods of cooling or heating fluidized beds have been based upon various physical processes. Thus, for instance, in the process of cracking hydrocarbons in fluidized beds, a flow of particles is withdrawn from the reactor and heated in an exchanger after which it is returned to the reactor. Since a regeneration of the particles proceeds in the heat exchanger also, it has generally been called a regenerator. By changes in the particle recirculation rate between the reactor and the regenerator, as well as in heat input to the regenerator, a change in the rate of heat supply to the reactor can be attained.

As heat is removed from the fluidized bed by a cooling medium flowing through coils, steam is generated, as a rule. In this case, the coil is surrounded and passed by a steam/water mixture. Since a constant pressure in the steam generated is maintained, the corresponding temperature of water to boil is constant. It is for this reasons that the aforementioned method of heat removal has been used when processing and achieving approximately constant outputs of the reactors wherein minor variations in composition of the raw material dosed are negligible, such as for example, in roasting of zinc concentrates. A casual temperature rise above an allowed limit can be prevented by injecting water into the fluidized bed.

The removal of heat from a fluidized-bed furnace for the combustion of all types of fuel is usually carried out by boiling water which is caused to flow through pipes or coils. The temperature difference prevailing between the fluidized bed and the boiling water and influencing the rate of heat removal from the fluidized bed, can be modified, within relatively narrow limits, by changing the temperature of the fluidized bed. The achievable range of changes in the fluidized bed temperature and the corresponding range of changes in the steam output of the fluidized-bed furnace, however, are lower than the required output range of the steam generator. Therefore, the fluidized-bed furnace is usually divided into a plurality of sections and an airborne fuel is supplied to some of them in order to attain the desired output from the steam generator.

Disadvantages of the methods for removing or supplying heat to the fluidized bed as hereinbefore set forth depend on the methods of heating or cooling the fluidized bed.

A method for cooling or heating the fluidized bed by means of recirculation of particles between the fluidized bed and of a heat exchanger located, as a rule, in the fluidized bed, is at best not very economical. When compared with other method, the prime costs are in this case higher than the cost of a fluidized bed arrangement including a heat exchanger. Moreover, the processing costs are increased by costs for the compression of the fluidizing gas and/or liquid substance in the fluidized-bed exchanger and by the costs to be spent for recirculation of particles between the heat exchanger and the reactor.

The cooling of the fluidized bed by a boiling liquid substance flowing through pipes or coils is in turn disadvantageous in that it does not make it possible to remove heat at a relatively high output range of the apparatus. The additional control achieved by injecting water into the fluidized bed is not economical, since a portion of heat cannot be utilized for steam generation in the cooling system. Moreover, in certain chemical reactions an elevated water/steam content in the reaction products can even be even detrimental.

The division of the fluidized bed into sections contributes to the complication of the plant as well as preventing from being fully automated, since it is necessary to separately measure and control the supplies of raw materials and of the fluidizing gas and/or liquid substance into each section of the fluidized bed.

The purpose of the present invention and the basic object of the same is to overcome the aforementioned disadvantages and to significantly improve the method of cooling or heating fluidized beds.

SUMMARY OF THE INVENTION

In accordance with one feature of our invention we provide a method of cooling or heating a fluidized bed, which comprises demixing or separating of the fluidized bed into two or more successive sectional fluidized beds differing from one another by the rate of longitudinal particle mixing, the flow of a fluidizing gas and/-for liquid substance being distributed into the two or more sectional fluidized beds.

In accordance with another feature of the invention the fluidized bed is demixed or separated by dividing the throughflow of fluidizing gas and/or liquid substance into one or more sectional flows and by introducing the sectional flows into different levels of the fluidized bed, a change in the cooling or heating rate being carried out by a change in throughflow of the fluidizing gas and/or liquid substance within the individual flows. By means of a heat exchanger in one or more sectional fluidized beds it is possible to bring about a temperature difference between adjacent sectional fluidized beds. This phenomenon can be utilized for controlling the temperature in the sectional fluidized bed.

The rate of longitudinal or radical particle mixing in a non-uniform fluidized bed depends upon the number of bubbles of the fluidizing gas and/or liquid substance ascending through the fluidized bed, since the bubble are followed also by trailing solid particles which are carried along therewith but which return from the level of the liquid substance back into the fluidized bed. Measurements clearly show that the amount of bubbles in a non-uniform fluidized bed is directly proportional to the amount of fluidizing gas and/or liquid substance surpassing the threshold of fluidization. This is the reason that the rate of longitudinal particle mixing can be controlled by the throughflow of the fluidizing gas and/or liquid substance.

The demixing or separating of the fluidized bed into sectional fluidized beds simultaneously and which have different rates of longitudinal particle mixing is attainable by dividing the throughflow of the fluidizing gas and/or liquid substance into several sectional flows and by introducing the same into different levels of the fluidized bed. The first fluidized bed of which the level is determined by the distance between the first and the second inlet of the fluidizing gas and/or liquid substance, is passed by the minimum amount of bubbles, since through that bed the minimum amount of the fluidizing gas and/or liquid substance flows. Therefore, the rate of longitudinal particle mixing in the aforesaid first sectional fluidized bed is minimum too. The second sectional fluidized bed of which the level is determined by the distance between the second and the third inlet of the fluidizing gas and/or liquid substance, is passed by the fluidizing gas and/or liquid substance in an amount which is determined by the sum of the liquid amounts in the first and the second liquid substance inlets. This is the reason that the rate of longitudinal particle mixing within the second sectional fluidized bed is higher than that in the first one. From the same reasons, the rate of longitudinal particle mixing rises above every next inlet of the fluidizing gas and/or liquid substance.

The amount of particles passing from one of the sectional fluidized bed into the adjacent one and being in a steady state equal to the amount of particles migrating in counterflow, determines heat transfer between the adjacent sectional beds. If, in one of the sectional fluidized beds heat is released from or introduced thereto and from the adjacent sectional bed it is withdrawn, then in case of a reduced rate of heat transfer between the sectional beds a considerable temperature difference may arise. An increase of the rate of heat transfer between the sectional fluidized beds, which increase is responsible for a reduction of the temperature difference therebetween, is attainable by increasing the amount of bubbles passing the boundary between the respective sectional fluidized beds.

The demixing or separating of the fluidized bed into a plurality of subbeds having different temperatures enables the rate of heat supply or heat removal to be continuously controlled. If, for instance, in the second sectional fluidized bed heat is released and a constant temperature is required at a variable heat release rate as well as at a constant temperature of cooling medium, then a heat exchanger is preferably placed in the first sectional fluidized bed. As the rate of heat exchange between the first and the second sectional fluidized bed is reduced, the temperature difference therebetween is high so that the difference of temperatures between the first sectional fluidized bed and the cooling medium is low. With increase in the rate of longitudinal particle mixing, the temperature difference between the first and the second fluidized bed drops. Consequently, the temperature difference between the first sectional fluidized bed and the cooling medium rises, which means that the cooling rate increases. By supplying overall amount of the cooling medium to the first sectional fluidited bed there can be attained the maximum temperature difference between the fluidized bed and the cooling medium and thus also the maximum heat removal rate. On the contrary, if the overall amount of the fluidizing gas and/or liquid substance flow through the second sectional fluidized bed, the heat removal rate is minimum, since any particle exchange between the first and the second sectional fluidized beds and consequently also the heat exchange caused by the mixing particle migration do not occur.

When compared with the methods of heating or cooling fluidized beds as hereinabove referred to, the novel improved method is advantageous in that it enables the supply or removal of heat to be continuously controlled even at a considerably variable rate of supply to or removal of heat from the fluidized bed, respectively. The control of both supply and removal of heat is here very easy, since it is sufficient only to change the volume ratios of the fluidizing gas and/or liquid substance supplied to different levels of the fluidized bed. Thus the method enables the heat supplied or removed to be utilized without thermal losses. In comparison with the method of heat exchange based upon the recirculation of particles between the reactor and the regenerator, the method according to the present invention is easier in that it provides an arrangement for the fluidized bed in which a heat exchanger is unnecessary so that the operation costs are lower by elimination of the expenses for the particle recirculation. Further, in comparison with the method of removing heat based upon the separation of the fluidized bed into individual sections, the novel method is advantageous in that it does not require any measurement and control of the supply of raw materials in concurrent flows of a number which corresponds to the number of sections.

The novel features which are considered as characteristic for the invention are set forth in particular in the appended claims. The invention itself, however, as to its method of operation, together with additional objects and advantages thereof will be best understood from the following description of specific embodiments when read in connection with the accompanying drawing.

DESCRIPTION OF THE PREFERRED EMBODIMENTS

Figure 1:
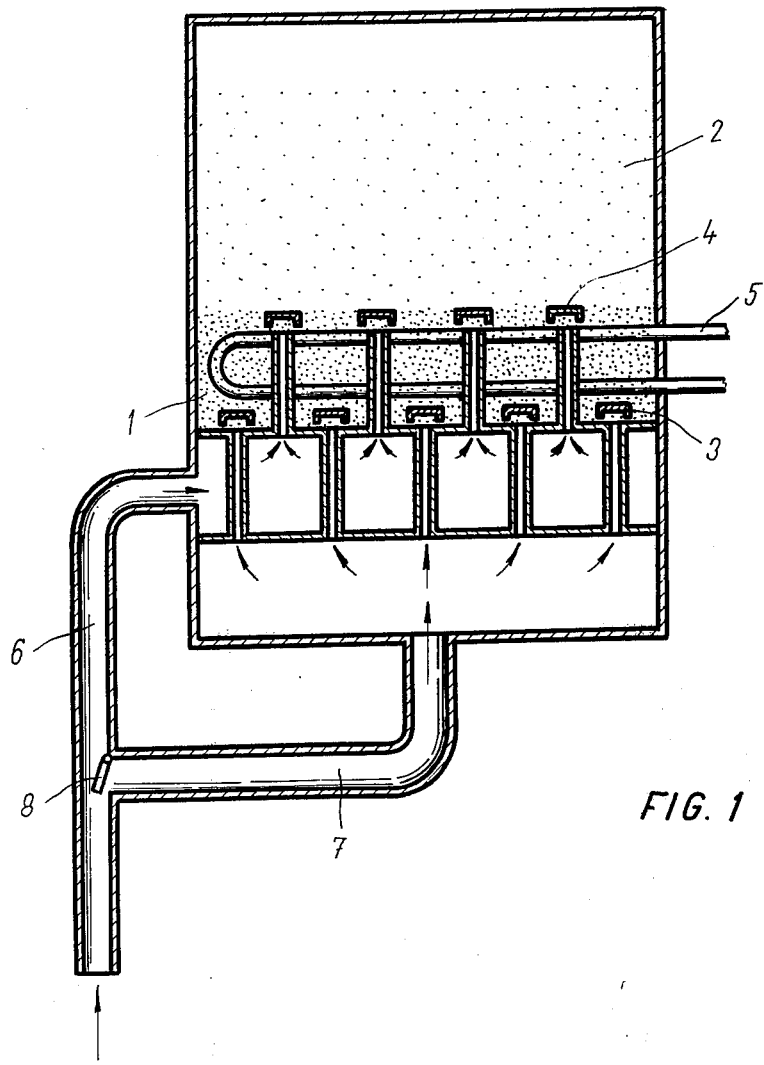
FIG. 1 schematically shows an apparatus for cooling or heating the fluidized bed in roasting a pyrite ore.

Referring now to FIG. 1 it can be seen that in the process of roasting a pyrite ore in a fluidized bed reactor, the sectioning of separating of the fluidized bed into two fluidized subbeds 1 and 2 can be attained by supplying a part of fluidizing gas and/or liquid substance through inlet 3 and another part thereof through inlet 4. The distance between the levels of the two inlets 3 and 4 of the fluidizing gas and/or liquid substance which determines the thickness or height of the first sectional fluidized bed is to chosen so as to allow the location of a heat exchanger therein which has a capacity corresponding to the maximum output desired. The required volume of the fluidizing gas and/or liquid substance is divided into separate flows through two pipe branches 6 and 7; a volume ratio of the fluidizing gas and/or liquid substance supplied through the respective branches 6 and 7, which volume is, for example, controllable by a valve 8, determines the rate of heat exchanger between the two sectional fluidized beds 1 and 2.

Should the fluidized bed be heated to a reaction temperature an air flow is adjusted so as to allow only a passage of such an air volumen through the pipe branch 7 and, consequently, through the inlet 3 which is incapable of bringing about the fluidization of the sectional bed 1. The remaining air volume is supplied into the fluidized bed through the inlet 4 above which another fluidized bed 2 arises. After the latter has been heated to the respective reaction temperature by means of an additional heat source, the dosage of a small amount of pyrite is started so as to attain adiabatic conditions. The dosage of pyrite will then be successively increased under simultaneous modification of the air volume in the pipe branches 6 and 7, respectively, till the desired output is reached.

The temperature in the sectional fluidized bed 1 is under all circumstances lower than in the bed 2 so that the combustion of pyrite occurs predominantly within the bed 2. As the temperatures in the fluidized beds 1 and 2 are equalized the maximum rate of heat removal is attained and any temperature control during further output increase is impossible.

Since any continuous change in the rate of longitudinal particle mixing between the two sectional fluisidized beds 1 and 2 depends upon the amount of bubbles passing the boundary region therebetween, and since this amount of bubbles is directly proportional to the volume of the liquid medium surpassing the threshold of fluidization, it is also possible to control the amount of bubbles as follows:

The air throughflow within the pipe branch 7 is adjusted such as by the valve 8 to a starting value at which the fluidization threshold is just attained, the throughflow in the branch 7 being then increased for a time. Within the next time interval, the throughflow will be reduced again to the starting value. The aforedescribed cycle is then repeated. The ratio of the time intervals of increased and basic throughflows is thus directly proportional to the rate of particle mixing and consequently to that of cooling. Likewise during the repeated changes in the throughflow of liquid medium through the pipe branch 7 the cooling rate may be continuously varied. During the basic air throughflow through the branch 7 the cooling rate is minimum. As the ratio between the time intervals of the increased and the basic throughflow grows, the cooling rate increases and attains its maximum value at permanently increased air throughflow through the pipe branch 7.

Figure 2:
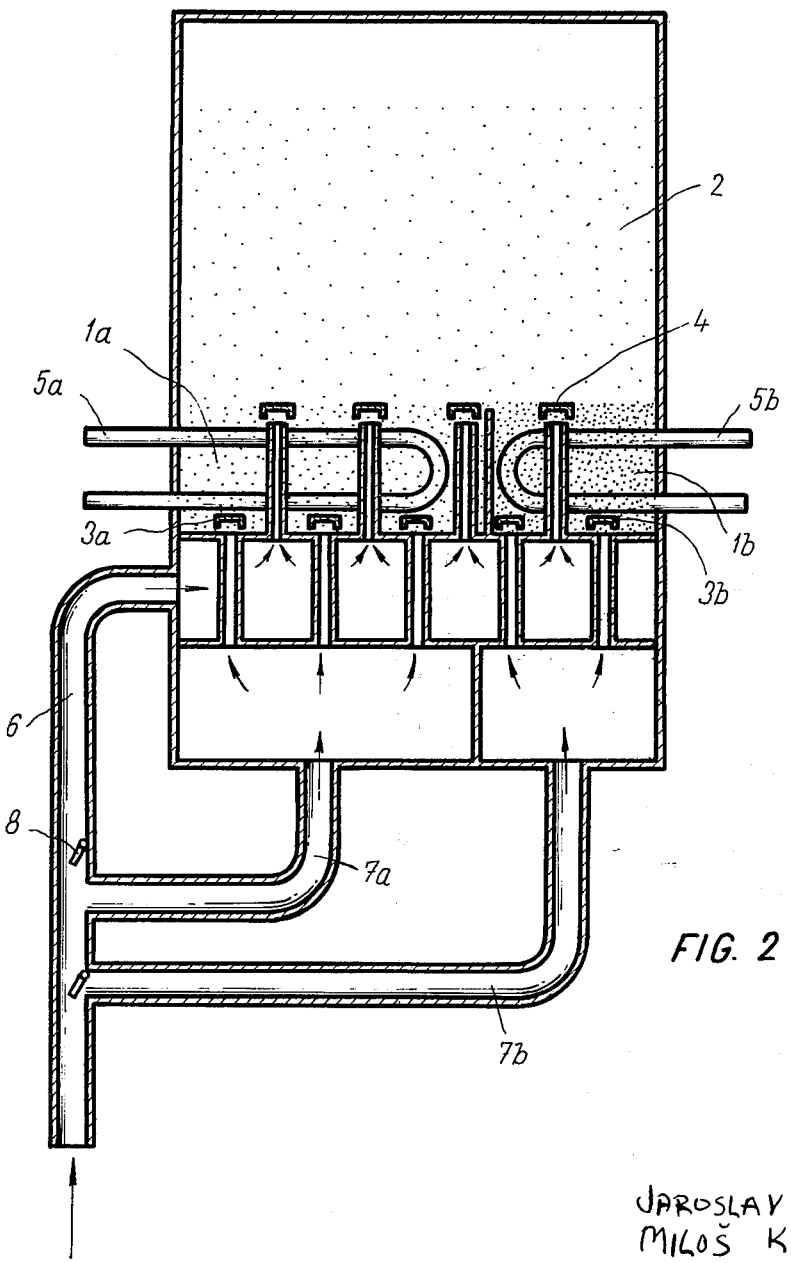
FIG. 2 a similar apparatus used in the processing of combustible solid fuels.

The method of cooling a fluidized bed in the process of combustion of solid fuels, carried out in the apparatus illustrated in FIG. 2, differs from that shown in FIG. 1 in that in the first sectional fluidized bed there are provided two heat exchangers having different temperatures of cooling medium such as the boiling section of a steam generator 5a and a steam preheater 5b. For this reason, the first sectional fluidized bed is divided into two rooms 1a and 1b in which a different temperatures prevail. Similarly the pipe branch 7 for suppling a portion of combusting air is bifurcated into two sections 7a and 7b. The processes of both heating the fluidized bed to the respective reaction temperature and controlling the temperature in the sectional bed 2 are analogous to those hereinabove referred to in case of pyrite roasting. The difference between them resides in the fact that through the section 7a and the inlet 3a such an amount of air is supplied so as to keep the temperature in the bed 2 constant. Similarly, through the section 7b and the inlet 3b an amount of air is supplied to maintain a constant temperature value on the outlet from the preheater 5b.

The possibilities of using the method of both cooling and heating fluidized beds, according to the present invention vary widely since the method can be utilized in a wide variety of both chemical and physical processes which can be practised in many industrial processes carried out in fluidized bed plants. Examples include processes of combusting fuels, roasting pyrites and zinc concentrates, and the catalytic oxidation of hydrocarbons and the like.

While the invention has been illustrated and described as embodied in a method of cooling or heating fluidized beds, it is not intended to be limited to the details shown, since various modifications may be made without departing in any way from the spirit of the present invention.

Without further analysis, the foregoing will so fully reveal the gist of the present invention that others can by applying current knowledge readily adapt it for various applications without omitting features that from the standpoint of prior art clearly constitute essential characteristics of the generic and specific aspects of this inventions and therefore, such adaptations should and are intended to be comprehended within the meaning and range of equivalence of the following claims.

What is claimed as new and desired to be protected by Letters Patent is set forth in the appended claims:

1. A method for adjusting and controlling the temperature in chemical reactors employing a single fluidized bed containing particles of varying size comprising the steps of a. separating the fluidized bed into at least two subbeds superimposed one on the other, each having different physical longitudinal particle mixes than the other;

b. introducing a fluid media in two sectional streams to each of said subbeds, said fluid media streams extending from the bottom of said fluidized bed upwardly into their respective associated subbeds in direct contact with the particles;

c. continuing the flow of the fluid media to said separated subbeds of the fluidized bed during the chemical reaction;

d. locating a fluid media exchanger at least in the lowermost of said subbeds of the separated fluidized bed in indirect contact with said particles in said bed; and e. varying the relative rate of flow of the fluid media through each of the separated subbeds of the fluidized bed to vary the physical longitudinal particle mixing intensities in each part.

2. The method as defined in claim 1 wherein the heat exchanging method is flowed through the lower most subbed of the separated fluidized bed in indirect contact therewith.

3. The method as defined in claim 1 including the step of varying the temperature of the separated subbeds of the fluidized bed by periodically increasing and decreasing the rate of flow of fluid media through separated subbeds.

4. The method as defined in claim 1 wherein said fluid media is gas.

5. The method as defined in claim 1 wherein said fluid media is liquid.

6. The method as defined in claim 1 including the step of vertically subdividing at least the part of the separated fluidized bed containing the immersed indirect heat exchanger into horizontally arranged sections each having different flow rates of the fluid media therethrough.

* * * * *